United States Patent
Suzuki et al.

(10) Patent No.: US 12,109,965 B2
(45) Date of Patent: Oct. 8, 2024

(54) FIXING STRUCTURE OF WEBBING

(71) Applicant: TACHI-S CO., LTD., Tokyo (JP)

(72) Inventors: Shogo Suzuki, Tokyo (JP); Atsushi Koike, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 18/201,701

(22) Filed: May 24, 2023

(65) Prior Publication Data
US 2024/0010154 A1    Jan. 11, 2024

(30) Foreign Application Priority Data
Jul. 6, 2022   (JP) .................................. 2022-108936

(51) Int. Cl.
*B60R 21/207*   (2006.01)

(52) U.S. Cl.
CPC .................. *B60R 21/207* (2013.01)

(58) Field of Classification Search
CPC .................................................. B60R 21/207
See application file for complete search history.

(56) References Cited

U.S. PATENT DOCUMENTS

| | | | | |
|---|---|---|---|---|
| 6,439,597 B1 * | 8/2002 | Harada | ................ | B60R 21/207 280/730.2 |
| 6,578,911 B2 * | 6/2003 | Harada | ................ | B60R 21/207 280/730.2 |
| 9,688,231 B2 * | 6/2017 | Saito | ................ | B60R 21/207 |
| 9,914,422 B2 * | 3/2018 | Yoo | ................ | B60R 21/207 |
| 10,252,690 B2 * | 4/2019 | Seo | ................ | B60R 21/2165 |
| 10,994,686 B2 * | 5/2021 | Inoue | ................ | B60R 21/215 |
| 11,548,463 B2 * | 1/2023 | Natsume | ................ | B60N 2/646 |
| 11,554,741 B2 * | 1/2023 | Bhagatkar | ......... | B60R 21/23138 |
| 2002/0063452 A1 * | 5/2002 | Harada | ................ | B60R 21/207 297/216.13 |

FOREIGN PATENT DOCUMENTS

JP        2008-037261 A        2/2008
WO    WO-2018179515 A1 * 10/2018 ............... B60N 2/64

* cited by examiner

*Primary Examiner* — Faye M Fleming
(74) *Attorney, Agent, or Firm* — Morgan, Lewis & Bockius LLP

(57) ABSTRACT

An object is to provide a fixing structure of a webbing which can improve workability when a webbing is mounted and can also contribute to cost reduction, and a vehicle seat provided therewith.

A fixing structure of a webbing in a vehicle seat having an airbag device, including an airbag module fixed to a seat frame of the vehicle seat, a first webbing and a second webbing surrounding the airbag module together with the seat frame and guiding the inflating airbag to an airbag outlet on a seat surface, a locked portion provided on a first end part of the first webbing, a fixed portion provided on a second end part of the second webbing, a locking member formed of a member having rigidity and having a fixing portion to which the fixed portion of the second webbing is fixed and a locking portion which hooks and locks the locked portion of the first webbing.

18 Claims, 12 Drawing Sheets

FIXING STRUCTURE OF WEBBING

BACKGROUND

Field

The present disclosure relates to a fixing structure of a webbing.

Description of Related Art

In a vehicle seat, a side airbag device which inflates and deploys a side airbag between an upper body of an occupant and a side door by operating gas generating means of an airbag module in the case of a collision or the like of a vehicle is in use (see Patent Publication JP 2008-037261 A).

Such side airbag device is disposed on a door side inside a seat or on a side part on a vehicle center side and is configured such that, when the airbag module is operated, an airbag accommodated inside is inflated, breaks a seat pad or a trim cover (seat cover) and dashes out to an outside of the seat. For the airbag module to function properly, the airbag needs to dash out through an airbag outlet provided at a predetermined portion of the seat. Thus, in order for the airbag to reliably dash out of an airbag outlet 106', webbings 10', 20' which connect the airbag module and the airbag outlet 106' and guide the inflating airbag to the airbag outlet 106' are provided inside the seat (see FIGS. 13 to 15). The webbings 10', 20' are typically disposed between an airbag module 202' and a seat pad 104', and end parts of the webbings 10', 20' are fixed to a seat frame 102' through a fixing member 300'.

A typical structure for fixing such webbings 10', 20' includes a bag structure (so-called a bag type) and a sheet metal structure (so-called a sheet-metal type). In the bag structure, an end part of each of two sheets of the webbings 10', 20' is fixed to the seat frame 102' and made into a bag shape and then, the seat pad 104' and the airbag module 202' are mounted, and the number of components is small and a cost is low, but a work of installing the airbag module 202' between the bag-shaped webbings 10', 20' while the seat pad 104' is pushed wide is considerably cumbersome and inferior in workability. In this point, in the sheet metal structure, the airbag module 202' is fixed to the seat frame 102' in advance and then, is covered by the webbings 10', 20', and sheet metals 310', 320' provided on the end parts of the webbings 10', 20' are fixed by a rivet 303' or a bolt, which is extremely excellent in workability in a point of installation of the airbag module 202'.

SUMMARY

However, the sheet metal structure having advantages as described above is found to still have a room for improvement in a point of a weight of the sheet metal structure itself and workability in mounting of the sheet metal. That is, with a structure in which the sheet metals 310', 320' are provided on each of the end parts of the two sheets of the webbing 10', 20', the weight can be large, which raises the cost easily. Moreover, an actual mounting work such as driving of the rivet 303' while holding the two sheet metals 310', 320' with one hand is not easy at all.

Thus, the present disclosure has an object to provide a fixing structure of a webbing which can improve workability when the webbing is mounted and can contribute to cost reduction.

An aspect of the present disclosure is a fixing structure of a webbing in a vehicle seat having an airbag device, including:

an airbag module fixed to a seat frame of the vehicle seat;
a first webbing and a second webbing surrounding the airbag module together with the seat frame and guiding an inflating airbag to an airbag outlet on a seat surface;
a locked portion provided on a first end part on a side opposite to an airbag outlet side of the first webbing;
a fixed portion provided on a second end part on a side opposite to the airbag outlet side of the second webbing; and
a locking member formed of a member having rigidity and having a fixing portion to which the fixed portion of the second webbing is fixed and a locking portion for hooking and locking the locked portion of the first webbing.

According to the fixing structure as described above, the webbings can be brought into an engaged state only by a simple operation of causing the locked portion of the first end part of the first webbing to be hooked and locked by the locking portion of the locking member in a state where the second end part of the second webbing is fixed. Moreover, while the state where the webbings are engaged with each other as described above is maintained, they can be fixed to the seat frame. Therefore, as compared with the conventional work of driving the rivet while holding the two sheet metals with one hand, a work of mounting the webbing is easy, and the workability is drastically improved. Moreover, with the fixing structure with such configuration, the number of components can be kept smaller than the conventional structure in which the sheet metals are used for an engaging portion and an engaged portion and thus, metal materials can be reduced, whereby weight reduction and cost reduction can be promoted.

The locking portion of the locking member in the fixing structure of the webbing in the aspect as above may be formed having a hook shape.

The locking portion in the fixing structure of the webbing in the aspect as above may be formed having the hook shape by a slit portion having such a shape that the locked portion of the first webbing can be inserted.

In the locking portion of the fixing structure of the webbing in the aspect as above, a retaining portion which suppresses removal of the locked portion inserted in the slit portion from the slit portion may be formed.

In the locking portion of the fixing structure of the webbing in the aspect as above, a guiding portion which guides the locked portion to the slit portion, when the locked portion is inserted into the slit portion, may be formed.

The guiding portion in the fixing structure of the webbing in the aspect as above may be formed so as to protrude from an inlet of the slit portion to a direction where the locked portion is located.

In the fixing structure of the webbing in the aspect as above, the locked portion of the first webbing may be configured such that a first end part of the first webbing is folded back and sewn into a loop shape.

The fixing structure of the webbing in the aspect as above may further include a fixing member which fixes the locking member to the seat frame in a state where the locked portion of the first webbing is locked by the locking portion of the locking member.

In the locking member in the fixing structure of the webbing in the aspect as above, the fixed portion by which the fixing member is locked may be provided.

The locking member in the fixing structure of the webbing in the aspect as above may be constituted by a sheet metal bent in the L-shape.

Another aspect of the present disclosure is a fixing structure of a webbing in a vehicle seat having an airbag device, including:

an airbag module fixed to a seat frame of the vehicle seat;

a first webbing and a second webbing surrounding the airbag module together with the seat frame and guiding the inflating airbag to an airbag outlet on a seat surface;

an inserting member having rigidity provided on a first end part on a side opposite to an airbag outlet side of the first webbing; and a bag-shaped inserted portion provided on a second end part on a side opposite to the airbag outlet side of the second webbing and capable of insertion of the inserting member.

According to the fixing structure as above, the inserting member having rigidity provided on the first end part of the first webbing is inserted into the inserted portion on the second end part of the second webbing, and the webbings are brought into an engaged state and then, they can be fixed to the seat frame. Therefore, as compared with the conventional work of driving a rivet while holding the two sheet metals with one hand, the work of mounting the webbing is easy, and workability is drastically improved. Moreover, with the fixing structure with the configuration as above, the number of components can be smaller than the conventional structure in which sheet metals are used for the engagement portion and the engaged portion and thus, the metal material can be reduced, whereby weight reduction and cost reduction can be also promoted.

The fixing structure of the webbing in the aspect as above may further include a fixing member which fixes the first end part of the first webbing and the second end part of the second webbing to the seat frame in a state where the inserting member is inserted into the inserted portion.

The inserted portion in the fixing structure of the webbing in the aspect as above may be formed having a bag shape by folding back a part of the second end part of the second webbing and sewing both sides of overlapped portions.

The inserting member in the fixing structure of the webbing in the aspect as above may include a core material having rigidity.

In the core material in the fixing structure of the webbing in the aspect as above, a fixing through hole through which the fixing member is passed may be provided.

In the inserted portion in the fixing structure of the webbing in the aspect as above, a fixing through hole may be provided at a position overlapping the fixing through hole in a state where the core material is inserted in the inserted portion.

The fixing structure of the webbing in the aspect as above may be a structure of fixing to the seat frame by the fixing member in a state, after the inserting member is inserted into the inserted portion, the first end part of the first webbing and the second end part of the second webbing are rotated around the inserted portion, wound up and overlapped.

In the fixing structure of the webbing in the aspect as above, an opening portion through which the fixing through hole is exposed may be provided in the first end part of the first webbing and the second end part of the second webbing in a rotated and overlapped state.

In the fixing structure of the webbing in the aspect as above, the opening portion may be constituted by a slit provided along longitudinal directions of the first end part of the first webbing and the second end part of the second webbing.

The fixing structure of the webbing in the aspect as above may further include a tightening member which tightens the inserted portion and the inserting member in a state where the inserting member is inserted in the inserted portion.

A vehicle seat, which is an aspect of the present disclosure, includes the fixing structure of the webbing as above.

According to the present disclosure, workability when the webbing is mounted can be improved, and contribution can be also made to cost reduction.

DETAILED DESCRIPTION

Figure 1:
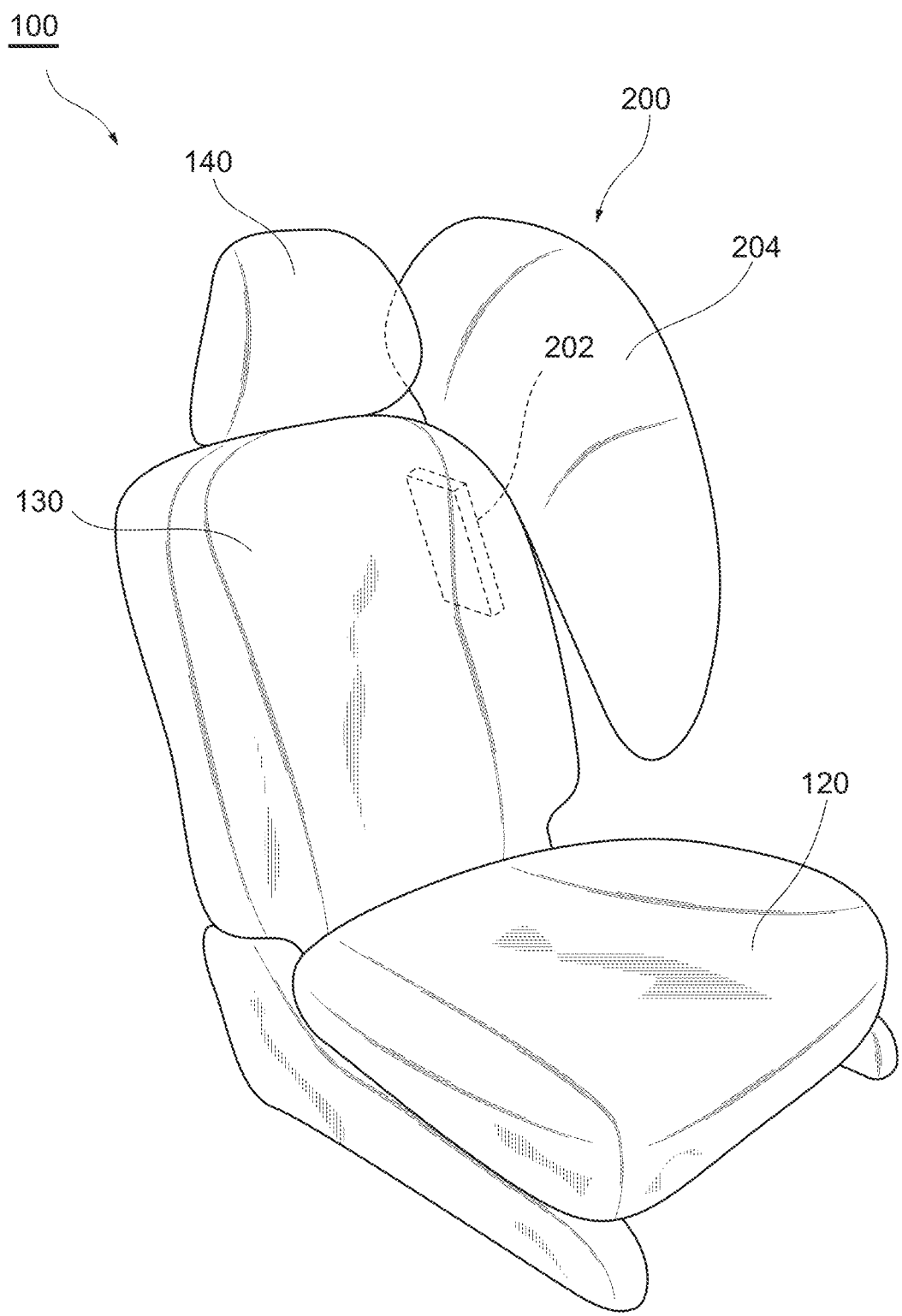
FIG. 1 is a perspective view illustrating an example of a vehicle seat on which a side airbag device is mounted.

By referring to the drawings, a preferred embodiment of the present disclosure will be explained in detail (see FIGS. 1 to 12).

Figure 7:
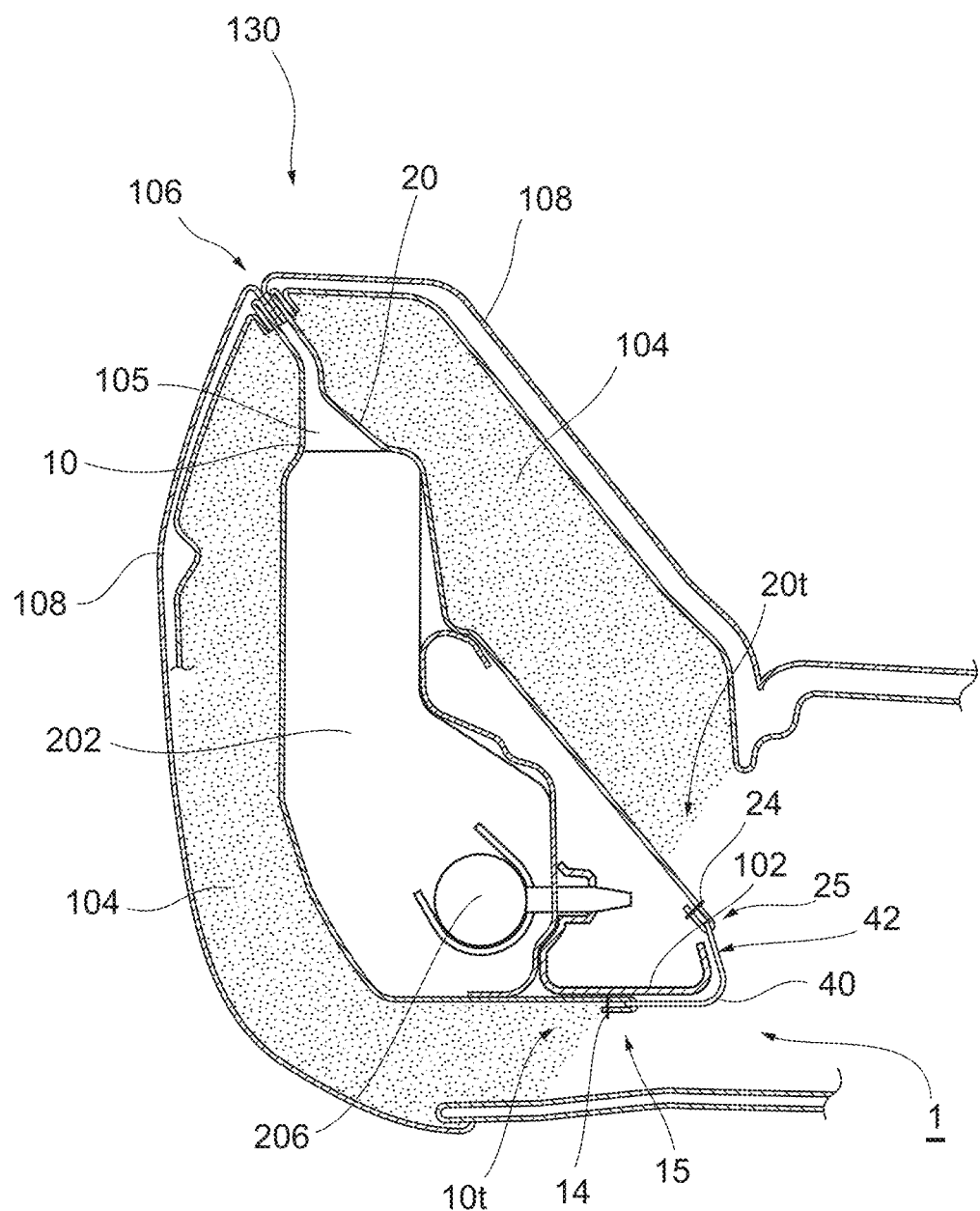
FIG. 7 is a view illustrating an example of the fixing structure of the webbing inside the vehicle seat.
Figure 8:
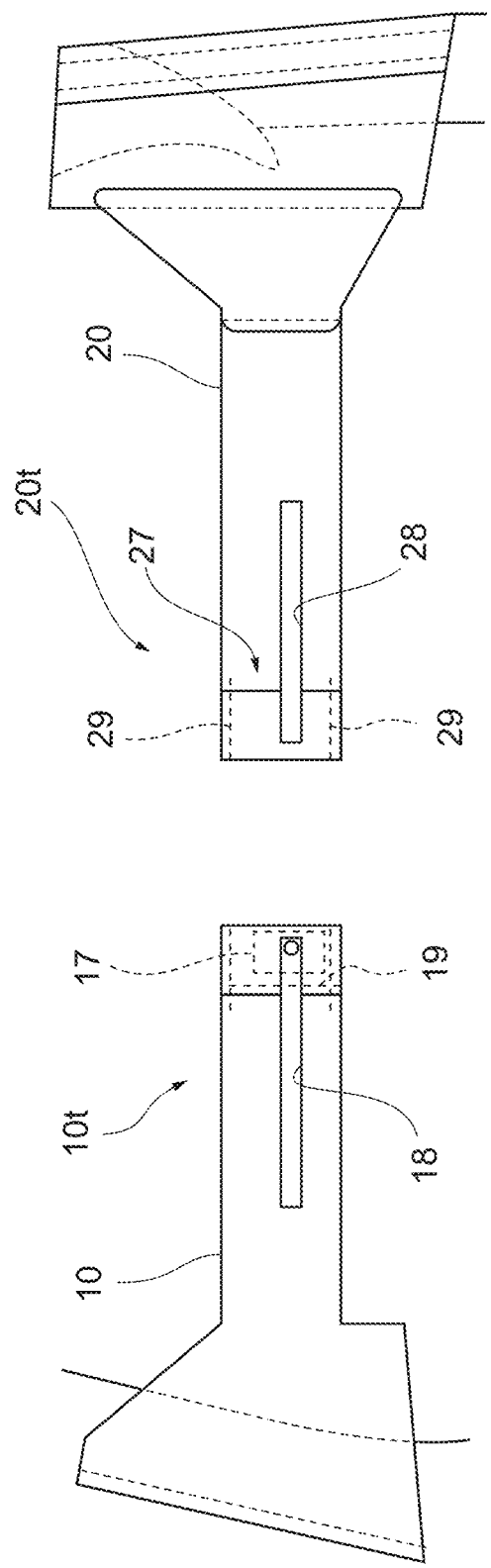
FIG. 8 is a view illustrating a first webbing and a second webbing in a second embodiment of the present disclosure.

A fixing structure 1 of a webbing according to the present disclosure is, in a vehicle seat 100 having an airbag device 200, a structure for fixing a webbing in the vehicle seat 100 (see FIGS. 1, 7 and the like). In the following, first, the vehicle seat 100 including the airbag device 200 will be described and then, a fixing structure 1 of the webbing will be explained.

Vehicle Seat Including Airbag Device

The vehicle seat 100 is a seat installed in a vehicle such as an automobile, for example, and includes a seat cushion 120 which supports buttocks and thighs of a seated occupant, a seatback 130 which supports a waist part and a back part of the occupant, a head rest 140 which supports a head part of the occupant, and an airbag module 202 (see FIG. 1).

The seatback 130 incorporates a seat frame 102 forming a frame of the seatback 130 (see FIG. 7 and the like). Though not particularly shown in detail, the seat frame 102 may be configured to include a pair of back-side frames disposed in a seat width direction with an interval and extending in a seat up-down direction and an upper frame (not shown) coupling upper end parts of the backside frames. In this embodiment, the seat frame is shown with a reference numeral 102 given to a part of the backside frame among them (see FIG. 7). The seat frame 102 is covered with a seat pad 104 made of relatively soft resin foaming material such as urethane foam and further covered with a trim cover 108 made of a skin material such as leather, a woven cloth, an unwoven cloth or the like.

The airbag module 202 is covered with the seat pad 104 and the trim cover 108 in a state fixed to the backside frame of the seat frame 102 and is incorporated in the seatback 130 (see FIG. 7). The airbag module 202 of this embodiment has an airbag 204 (see FIG. 1) and an inflator 206 which inflates the airbag 204. When the airbag module 202 is operated, the airbag 204 is deployed to the sides of the seatback 130 and the head rest 140 and prevents a collision of the occupant seated on the vehicle seat 100 (a collision with a passenger seated on another seat provided adjacent to the vehicle seat 100 or a collision with a door of the vehicle or the like, for example).

Figure 2:
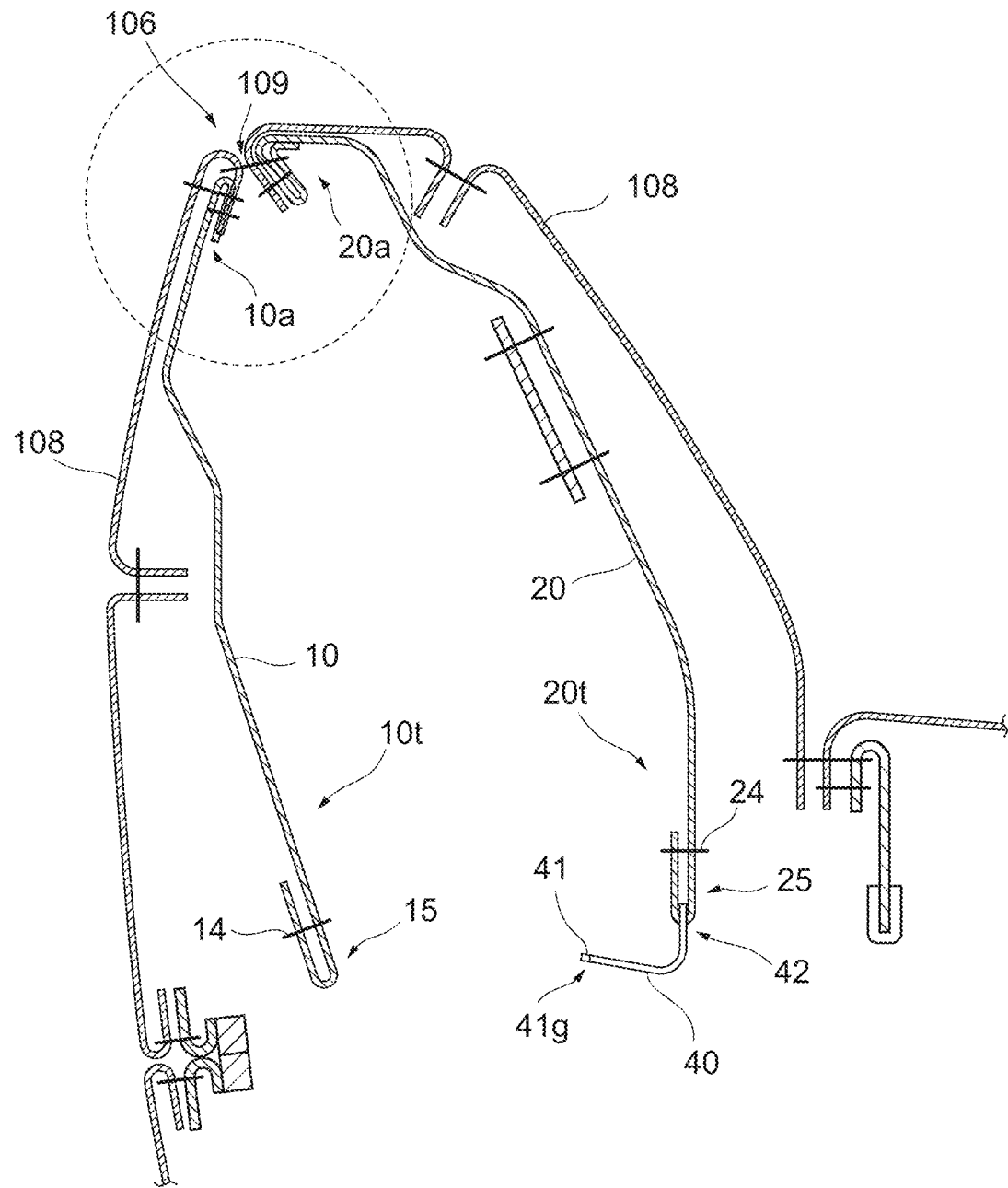
FIG. 2 is a plan view illustrating an example of a fixing structure of a webbing in a first embodiment of the present disclosure.
Figure 3:
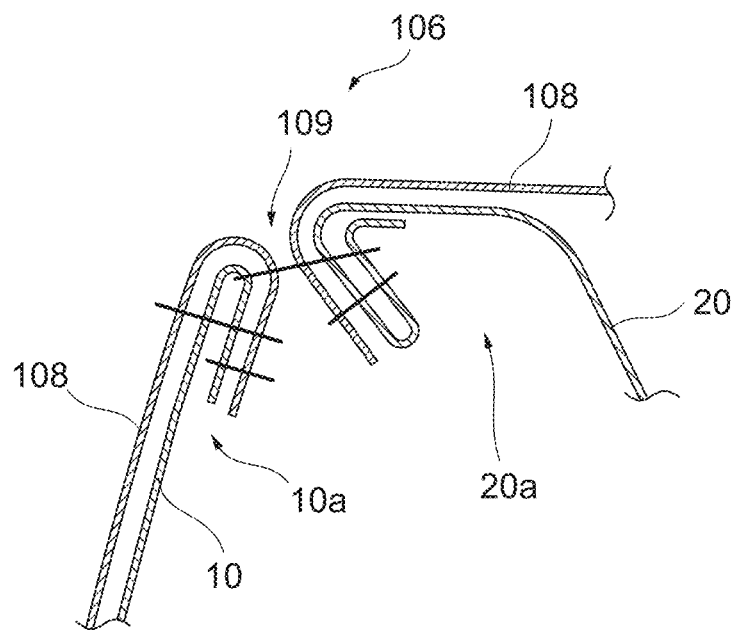
FIG. 3 is a view illustrating a part circularly surrounded by a broken line in FIG. 2 in an enlarged manner.
Figure 4:
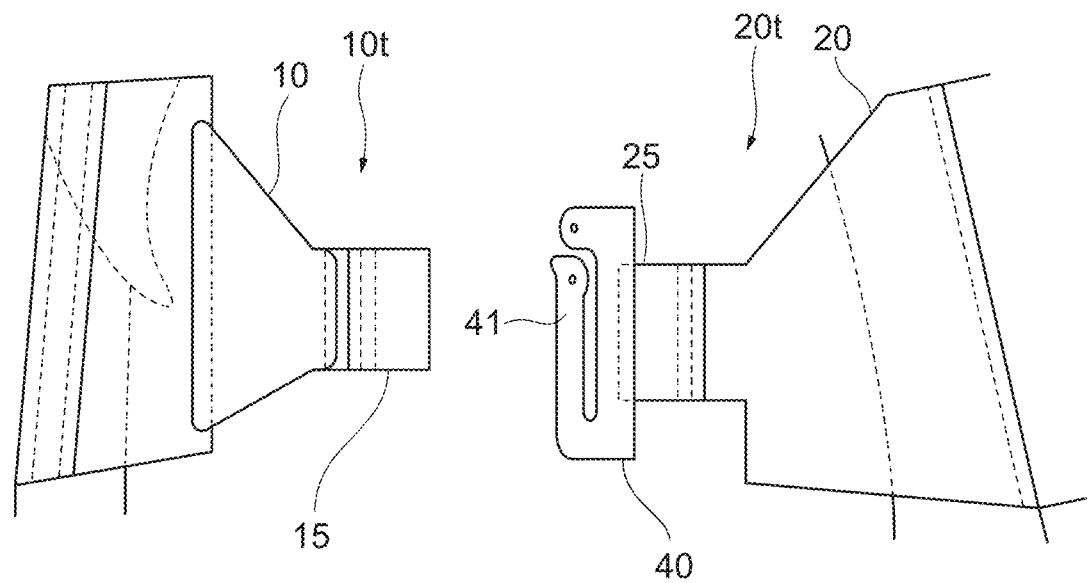
FIG. 4 is a view illustrating an example of a first webbing as well as a second webbing and a locking member.
Figure 5:
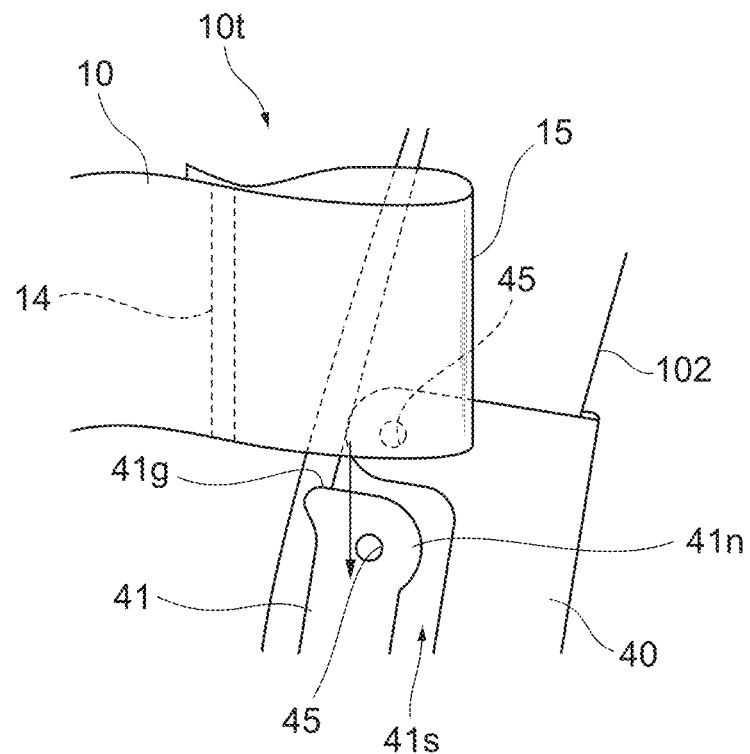
FIG. 5 is a view illustrating a state when a locked portion of the first webbing is inserted into a slit portion of the locking member.

At a part which becomes an airbag outlet 106 in the trim cover 108, a rupture portion 109 which is easily ruptured is provided (see FIGS. 2, 3 and the like). The rupture portion 109 is constituted by a part in which a plurality of the skin materials are sewn together in a state where they are easily ruptured at an operation of the airbag module 202. In the seat pad 104, a slit 105 going from the airbag module 202 to the rupture portion 109 is provided (see FIG. 7).

Though not particularly shown, in the vehicle, an acceleration sensor which detects a collision of the vehicle and an ECU (Electronic Control Unit) which determines necessity of the operation of the inflator 206 on the basis of a signal output from the acceleration sensor are mounted. When a predetermined signal is transmitted from the ECU, the inflator 206 is operated and generates a gas and inflates the airbag 204. The inflated airbag 204 reaches the rupture portion 109 through the slit 105, ruptures the rupture portion 109 by an inflation pressure, and dashes out to the outside of the seatback 130.

The vehicle seat 100 includes a webbing which guides the inflating airbag 204 to the rupture portion 109. The vehicle seat 100 of this embodiment includes a first webbing 10 and a second webbing 20 (see FIGS. 2, 3, and the like) as the webbing. The first webbing 10 and the second webbing 20 are constituted by a material with less stretchability such as a woven cloth using polyester fibers and polyamide fibers, an unwoven cloth, and the like. End parts 10a, 20a on the airbag outlet 106 side of each of the first webbing 10 and the second webbing 20 are sewn together with the skin material forming the trim cover 108 at the rupture portion 109 and are pulled to the airbag module 202 through the slit 105 (see FIGS. 2, 3, and 7). The first webbing 10 and the second webbing 20 pulled to the airbag module 202 branch to both sides of the airbag module 202 so as to surround the airbag module 202 together with the seat frame 102 (see FIG. 7). The end parts on a side opposite to the airbag outlet 106 side of each of the first webbing 10 and the second webbing 20 (in this Description, they are called a first end part and a second end part and indicated by signs 10t, 20t) are fixed to the seat frame 102 by the fixing structure 1 of the webbing.

Fixing Structure of Webbing (First Embodiment)

The fixing structure 1 of the webbing in this embodiment is constituted by the airbag module 202, the first webbing 10 as well as the second webbing a locked portion 15 provided on the first end part 10t of the first webbing 10, a fixed portion 25 provided on the second end part 20t of the second webbing the hook member (locking member) 40 and the like (see FIGS. 4 to 7 and the like).

A hook member 40 is a member with rigidity constituted to lock the first end part 10t of the first webbing 10 and the second end part 20t of the second webbing 20 with a simple operation and to maintain a locked state. As an example, in this embodiment, the hook member 40 made of a sheet metal and having a shape bent into an L-shape along the seat frame 102 is employed (see FIG. 2). On this hook member 40, a locking portion 41, a fixing portion 42, and a fixed portion 45 are provided (see FIGS. 4 to 6).

The locking portion 41 is provided so as to lock the locked portion 15 provided on the first end part 10t of the first webbing 10. In this embodiment, a slit portion 41s having a shape into which the locked portion 15 of the first webbing 10 can be inserted is provided in the hook member 40, and by means of this slit portion 41s, a part of the hook member 40 is caused to function as the locking portion 41 having a hook shape (see FIGS. 5 and 6). With respect to the locking portion 41 formed having the hook shape as above, the locked portion 15 of the first webbing 10 can be hooked and locked by being caused to slip toward the slit portion 41s. Moreover, on the locking portion 41, a retaining portion 41n and a guiding portion 41g are further provided. The retaining portion 41n suppresses removal of the locked portion 15 inserted into the slit portion 41s from the slit portion 41s and is constituted by a rounded part protruding from the locking portion 41 toward the slit portion 41s so as to narrow a part of the slit portion 41s, for example (see FIGS. 5 and 6). The guiding portion 41g is provided so as to facilitate a work of inserting a locked portion into the slit portion 41s by guiding the locked portion 15 of the first webbing to the slit portion 41s. In this embodiment, for example, a protruding part formed on the locking portion 41 so that a step is formed by protruding from an inlet of the slit portion 41s to the outside (direction in which the locked portion is located) is caused to function as the guiding portion 41g (see FIG. 5).

The fixing portion 42 is a part where the fixed portion 25 of the second webbing 20 is fixed. In this embodiment, though not illustrated particularly in detail, a slit-shaped vertical hole through which the second end part 20t of the second webbing 20 is passed is caused to function as the fixing portion 42, for example (see FIG. 2). The second webbing 20 passed through the slit-shaped vertical hole is folded back and sewn by a fixing thread 24 so as to form the loop-shaped fixed portion 25.

The fixed portion 45 is a part provided for locking the fixing member such as a rivet 30 when the hook member 40 is to be fixed to the seat frame 102. In this embodiment, a round through hole through which the rivet 30 is passed is provided as the fixed portion 45, but its shape is not particularly limited and may be a mode other than the through hole (a notch, for example). In the hook member 40 in this embodiment, two through holes are provided as the fixed portions 45 (see FIG. 5), and the hook member 40 mounted on the seat frame 102 by the rivets 30 passed through each of the through holes is fixed more firmly and is not rotated easily (see FIG. 6). Moreover, by fixing the hook member 40 to the seat frame 102 with a predetermined attitude by using the rivet 30, such a state can be realized that the locked portion 15 of the first webbing 10 is not easily removed from the locking portion 41 (see FIG. 6).

The locked portion 15 on the first end part 10t of the first webbing 10 is formed so as to be in a locked state by being hooked by the locking portion 41 of the hook member 40. In this embodiment, the loop-shaped sewn part formed by folding back the first end part 10t of the first webbing 10 and sewing it a fixing thread 14 is caused to function as the locked portion 15 (see FIGS. 2, 4, 5 and the like).

The fixed portion 25 of the second end part 20t of the second webbing 20 is fixed to the fixing portion 42 of the hook member 40. As described above, in this embodiment, the second webbing 20 is passed through the slit-shaped vertical hole (not shown) of the hook member 40 and folded back and sewn by the fixing thread 24 so as to form the loop-shaped fixed portion 25 (see FIG. 2).

Figure 6:
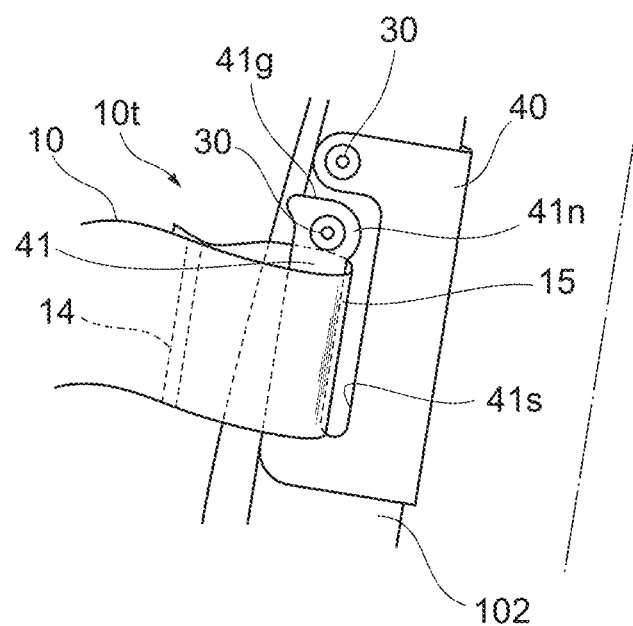
FIG. 6 is a view illustrating the locking member fixed to a seat frame by a rivet.

According to the fixing structure 1 of the webbing constituted as above, by operating a simple operation of hooking a part of the locked portion 15 on the first end part 10t of the first webbing 10 by the locking portion 41 of the hook member 40 in a state where the second end part 20t of the second webbing 20 is fixed in advance (see FIG. 5) and of inserting it into the slit portion 41s so as to slip and of locking it, such a state where the webbings are engaged with each other can be realized (see FIG. 6 and the like). Moreover, since the hook member 40 can be fixed to the seat frame 102 by using the fixing member such as the rivet 30 in the state where the webbings are engaged with each other as above, as compared with the conventional work in which the rivet is driven while the two sheet metals are held with one hand, the work of mounting the webbing can be performed easily, which is superior in the workability. Moreover, with the fixing structure 1 with the configuration as above, the number of components can be smaller than that of the conventional structure in which the sheet metals are used for an engaging portion and an engaged portion and thus, the metal materials are reduced, whereby weight reduction and cost reduction can be promoted.

Fixing Structure of Webbing (Second Embodiment)

The fixing structure 1 of the webbing in this embodiment is constituted by the airbag module 202, the first webbing 10 as well as the second webbing an inserting member 17 provided on the first end part 10t of the first webbing 10, an inserted portion 27 provided on the second end part 20t of the second webbing 20 and the like (see FIGS. 4 to 7 and the like).

The inserting member 17 is a member having rigidity provided on the first end part 10t on the side opposite to the airbag outlet side of the first webbing 10. In this embodiment, a core material made of a sheet metal is mounted on the first end part 10t of the first webbing 10, and the core material is used as the inserting member 17 (see FIG. 8). A mounting method of the core material is not particularly limited. In this embodiment, in a state where the first end part 10t of the first webbing 10 is folded back and sandwiches the sheet metal, a periphery thereof is sewn together by the fixing thread 19 so as to mount the sheet metal (see FIG. 9 and the like). Moreover, in the inserting member (core material in this embodiment) 17, a fixing through hole 17h through which the fixing member such as the rivet 30 is passed is provided (see FIGS. 8 and 9).

The inserted portion 27 is formed having a bag shape on the second end part 20t on the side opposite to the airbag outlet side of the second webbing 20 so that the inserting member 17 described above can be inserted (see FIG. 8 and the like). In the fixing structure 1 of this embodiment, by folding back a part of the second end part 20t of the second webbing 20 and by sewing both sides (both edges) of the overlapped parts with a sewing thread 29, the pocket-shaped inserted portion 27 is formed (see FIG. 9 and the like). Moreover, at a position in the inserted portion 27 overlapped with the fixing through hole 17h in a state where the inserting member (core material in this embodiment) 17 is inserted into the inserted portion 27, a fixing through hole 27h is provided (see FIGS. 9 and 10).

Figure 9:
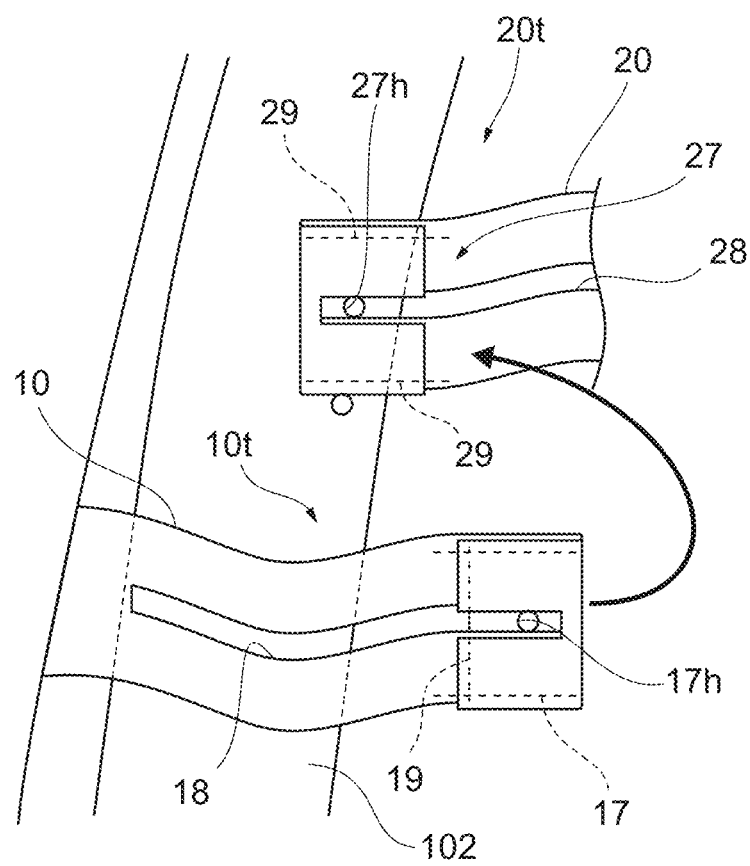
FIG. 9 is a view illustrating a state where an inserting member of the first webbing is being inserted into an inserted portion of the second webbing.

According to the fixing structure 1 as above, the state where the inserting member 17 of the first webbing 10 is folded back is brought about, and only by inserting it in the inserted portion 27 of the second webbing 20, such a state that the first webbing 10 and the second webbing 20 are engaged can be brought about (see FIG. 9 and the like). Moreover, by passing the rivet 30 through the fixing through hole 17h and the fixing through hole 27h which are overlapped and by driving the rivet 30 into the seat frame 102, the first webbing and the second webbing 20 can be fixed to the seat frame 102 in the engaged state (see FIG. 10).

Figure 11:
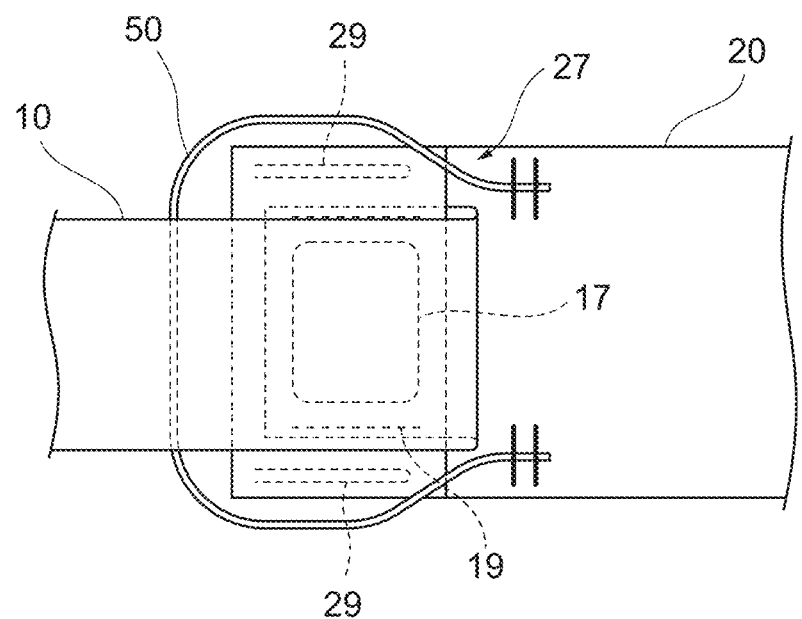
FIG. 11 is a view illustrating that, in a state where the inserting member of the first webbing is inserted into the inserted portion of the second webbing, the inserted portion and inserting member are tightened by a tightening member.

Moreover, in the fixing structure 1 as above, in the state where the inserting member 17 is inserted in the inserted portion 27, the inserted portion 27 and the inserting member 17 may be tightened by a tightening member 50 (see FIG. 11). By tightening them by the tightening member 50, the first webbing 10 and the second webbing 20 are brought into a more firmly engaged state, and removal of the inserting member 17 from the inserted portion 27 can be suppressed. This can be considered to be a more preferable configuration from a viewpoint of counteracting a tension acting on the engagement part between the first webbing 10 and the second webbing 20 when the airbag device 200 is operated. As the tightening member 50, for example, such a thing may be used that a loop-shaped string is added to the second webbing and in the state where the first webbing 10 and the second webbing 20 are engaged, the string is passed through the inserting member (core material in this embodiment) 17 (see FIG. 11).

Figure 10:
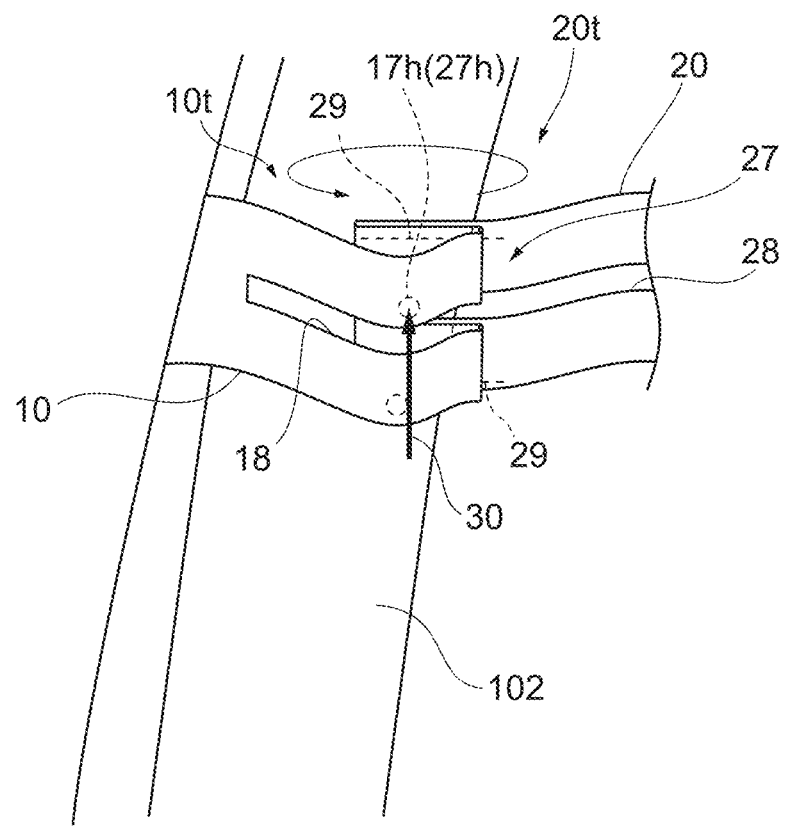
FIG. 10 is a view illustrating a state where the inserting member of the first webbing has been inserted in the inserted portion of the second webbing.
Figure 12:
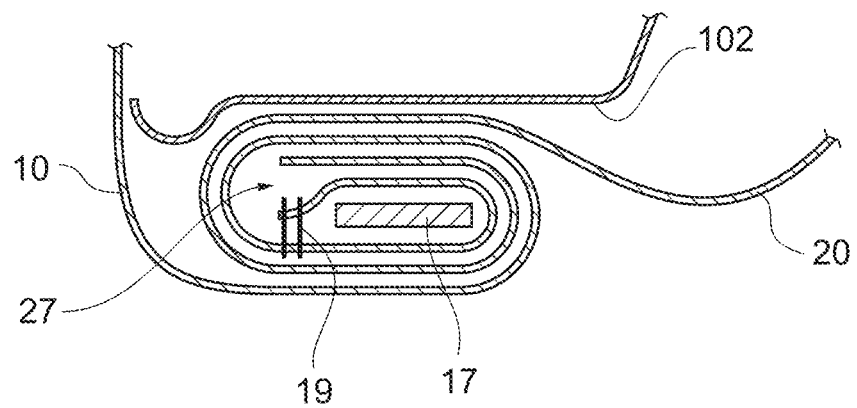
FIG. 12 is a view illustrating a state in which, after the inserting member of the first webbing is inserted into the inserted portion of the second webbing, a first end part of the first webbing and a second end part of the second webbing are rotated around the inserted portion, wound up, and overlapped.
Figure 13:
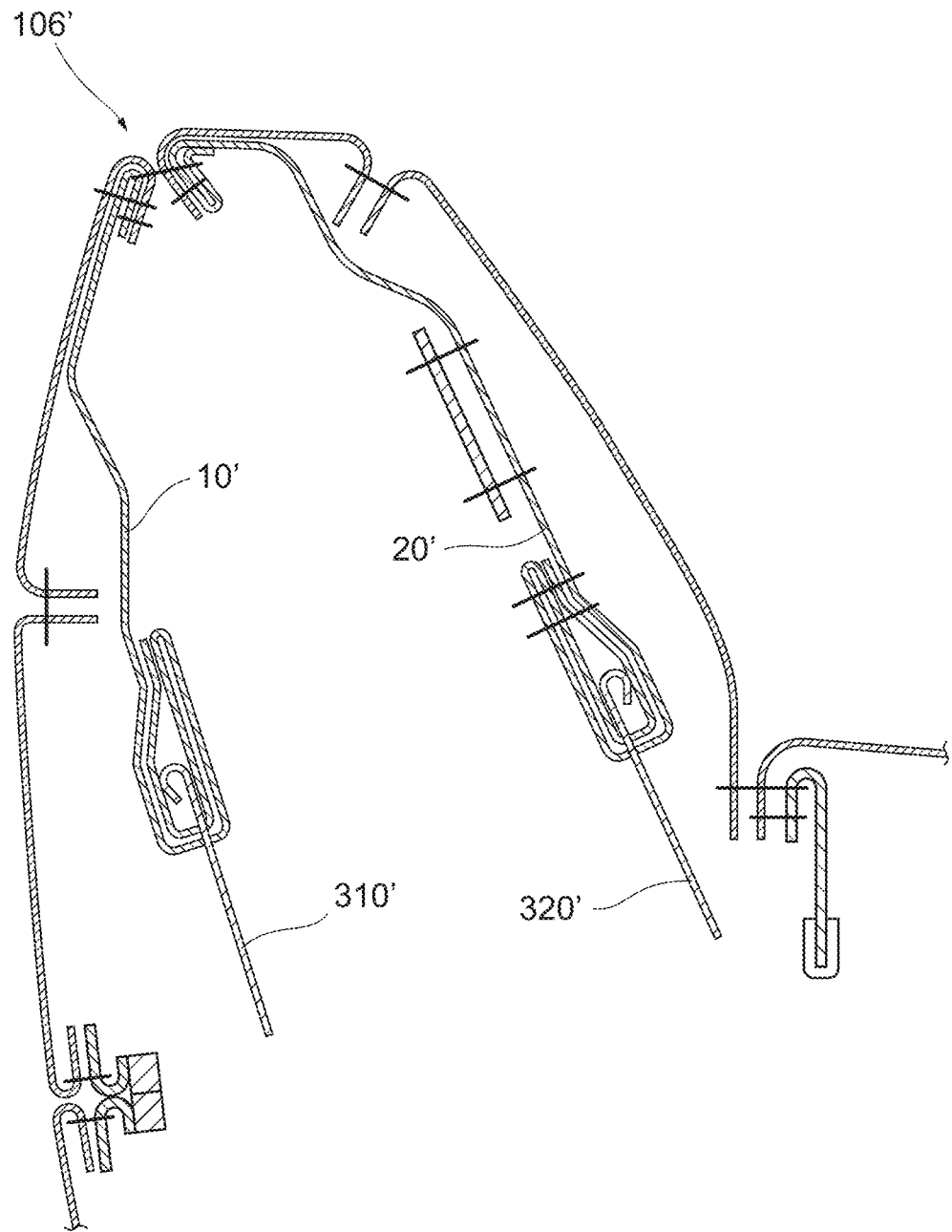
FIG. 13 is a plan view illustrating an example of a conventional fixing structure of a webbing as a reference.
Figure 14:
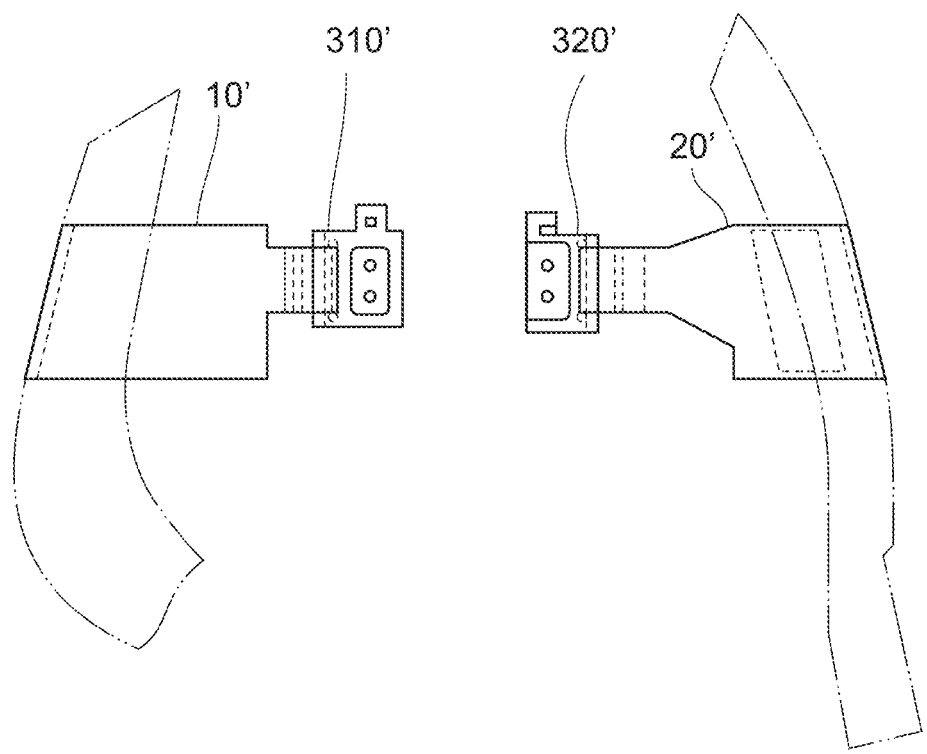
FIG. 14 is a view illustrating an example of the conventional webbing as a reference.
Figure 15:
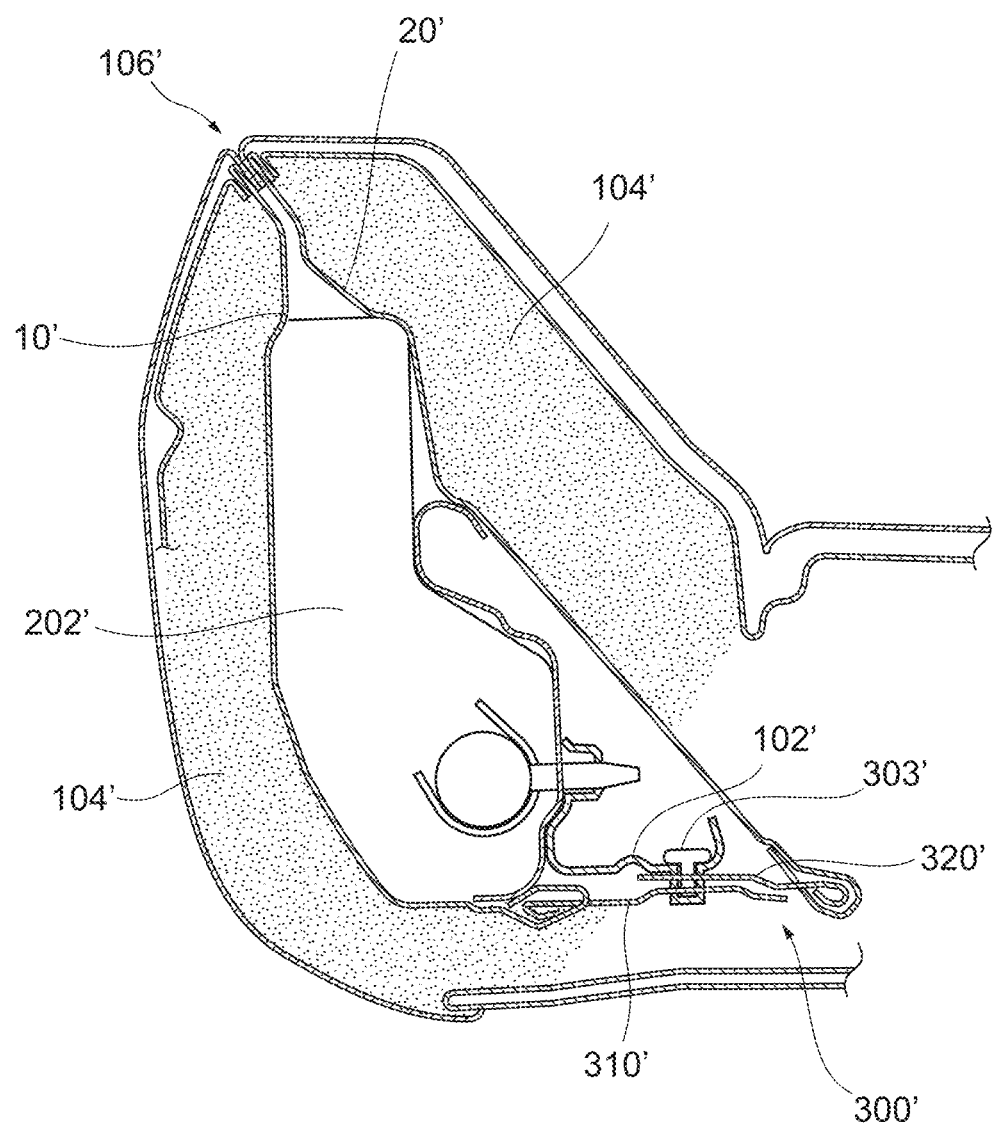
FIG. 15 is a view illustrating an example of the conventional fixing structure of the webbing inside the vehicle seat as a reference.

Moreover, in the fixing structure 1 as above, it may be configured such that, after the inserting member 17 is inserted into the inserted portion 27, a state where the first end part 10t of the first webbing 10 and the second end part 20t of the second webbing 20 are rotated around the inserted portion 27 and wound up and overlapped (wound around state) is brought about and then, it is fixed to the seat frame 102 by the rivet 30 (see FIGS. 10 and 12). As described above, when the first end part 10t of the first webbing 10 and a second end part 20t of the second webbing 20 are rotated and wound up, an engaging force of the both can be enhanced, and a larger tension can be caused to act to the first webbing 10 and the second webbing 20. In the case of the fixing structure 1 in which the both are rotated and wound so as to be wound up and then, fixed by the rivet 30 as above, an opening portion through which the fixing through holes 17h, 27h are exposed in a rotated and overlapped state may be provided in the first end part 10t of the first webbing 10 and the second end part 20t of the second webbing 20. In this embodiment, slits 18, 28 extending along the longitudinal direction are provided in each of the first end part 10t of the first webbing 10 and the second end part 20t of the second webbing 20 (see FIGS. 8 to 10). When the first end part 10t of the first webbing 10 and the second end part 20t of the second webbing 20 are rotated and overlapped, the first webbing 10 and the second webbing 20 are brought into an exposed state without interfering with the fixing through holes 17h, 27h due to presence of these slits 18, 28 (see FIG. 10 and the like).

In this embodiment, a form in which the first end part 10t of the first webbing 10 and the second end part 20t of the second webbing 20 are fixed to the seat frame 102 by using the rivet (fixing member) 30 was explained, but this is only a preferred example. Though not particularly shown, by having such a structure that each of (the first end part 10t of) the first webbing 10 and (the second end part 20t of) the second webbing 20 are mounted on separate parts of the seat frame 102 or by having such a structure that a part of the seat frame 102 is notched in a hook shape in advance, and a part like the bag-shaped inserted portion provided on the first webbing 10 and the second webbing 20 is hooked by this notch part, the first webbing 10 and the second webbing 20 may be fixed to the seat frame 102 without using the rivet or the like, for example.

According to the fixing structure 1 of this embodiment, such a state where the inserting member 17 having rigidity provided on the first end part 10t of the first webbing 10 is inserted into the inserted portion 27 of the second end part 20t of the second webbing 20, and the webbings are engaged with each other is brought about and then, they can be fixed to the seat frame 102 (see FIG. 10 and the like). Therefore, as compared with the conventional work in which the rivet is driven while the two sheet metals are held with one hand, the work of mounting the webbing can be performed easily, and workability is drastically improved. Moreover, with the fixing structure 1 with the configuration as above, the number of components can be smaller than the conventional structure in which the sheet metals are used for the engaging portion and the engaged portion, and a size of a metal material used for the core material can be small and thus, the metal material can be reduced, whereby the weight reduction and the cost reduction can be promoted.

The aforementioned embodiments are preferred examples of the present disclosure but they are not limiting and various deformations can be worked within a range not departing from the gist of the present disclosure.

The present disclosure is suitable by being applied to a fixing structure of a webbing in a vehicle seat having an airbag device.

What is claimed is:

1. A fixing structure of a webbing in a vehicle seat having an airbag device, comprising:
    an airbag module fixed to a seat frame of the vehicle seat;
    a first webbing and a second webbing surrounding the airbag module together with the seat frame and guiding an inflating airbag to an airbag outlet on a seat surface;
    a locked portion provided on a first end part on a side opposite to a side of the airbag outlet of the first webbing;
    a fixed portion provided on a second end part on a side opposite to the airbag outlet side of the second webbing; and
    a locking member formed of a member having rigidity and having a fixing portion to which the fixed portion of the second webbing is fixed and a locking portion for hooking and locking the locked portion of the first webbing,
    wherein the locking portion is formed having a hook shape by a slit portion having such a shape that the locked portion of the first webbing can be inserted, and
    a retaining portion which suppresses removal of the locked portion inserted into the slit portion from the slit portion is formed on the locking portion, or the locked portion of the first webbing is configured such that the first end part of the first webbing is folded back and sewn into a loop shape.

2. The fixing structure of a webbing according to claim 1, wherein
    the retaining portion is formed on the locking portion.

3. The fixing structure of a webbing according to claim 1, wherein
    a guiding portion which guides the locked portion to the slit portion at insertion into the slit portion is formed on the locking portion.

4. The fixing structure of a webbing according to claim 3, wherein
    the guiding portion is formed to protrude from an inlet of the slit portion to a direction where the locked portion is located.

5. The fixing structure of a webbing according to claim 1, wherein
    the locked portion of the first webbing is configured such that the first end part of the first webbing is folded back and sewn into a loop shape.

6. A fixing structure of a webbing in a vehicle seat having an airbag device, comprising:
    an airbag module fixed to a seat frame of the vehicle seat;
    a first webbing and a second webbing surrounding the airbag module together with the seat frame and guiding an inflating airbag to an airbag outlet on a seat surface;
    a locked portion provided on a first end part on a side opposite to a side of the airbag outlet of the first webbing;
    a fixed portion provided on a second end part on a side opposite to the airbag outlet side of the second webbing;
    a locking member formed of a member having rigidity and having a fixing portion to which the fixed portion of the second webbing is fixed and a locking portion for hooking and locking the locked portion of the first webbing; and
    a fixing member which fixes the locking member to the seat frame in a state where the locked portion of the first webbing is locked by the locking portion of the locking member.

7. The fixing structure of a webbing according to claim 6, wherein
    a fixed portion by which the fixing member is locked is provided on the locking member.

8. The fixing structure of a webbing according to claim 1, wherein
    the locking member is constituted by a sheet metal bent in an L-shape.

9. A fixing structure of a webbing in a vehicle seat having an airbag device, comprising:
    an airbag module fixed to a seat frame of the vehicle seat;
    a first webbing and a second webbing surrounding the airbag module together with the seat frame and guiding an inflating airbag to an airbag outlet on a seat surface;

an inserting member having rigidity provided on a first end part on a side opposite to a side of the airbag outlet of the first webbing; and an inserted portion having a bag shape provided on a second end part on a side opposite to the airbag outlet side of the second webbing and capable of inserting the inserting member.

10. The fixing structure of a webbing according to claim 9, further comprising:

a fixing member which fixes the first end part of the first webbing and the second end part of the second webbing to the seat frame in a state where the inserting member is inserted in the inserted portion.

11. The fixing structure of a webbing according to claim 9, wherein the inserted portion is formed having a bag shape by sewing both sides of a part in which a part of the second end part of the second webbing is folded back and overlapped.

12. The fixing structure of a webbing according to claim 10, wherein the inserting member includes a core material having rigidity.

13. The fixing structure of a webbing according to claim 12, wherein a fixing through hole through which the fixing member is passed is provided in the core material.

14. The fixing structure of a webbing according to claim 13, wherein in the inserted portion, a fixing through hole is provided at a position overlapped with the fixing through hole in a state where the core material is inserted into the inserted portion.

15. The fixing structure of a webbing according to claim 14 being a structure of fixing to the seat frame by the fixing member in a state where the first end part of the first webbing and the second end part of the second webbing are rotated around the inserted portion, wound up, and overlapped after the inserting member is inserted into the inserted portion.

16. The fixing structure of a webbing according to claim 15, wherein an opening portion through which the fixing through hole is exposed is provided in the first end part of the first webbing and the second end part of the second webbing in a rotated and overlapped state.

17. The fixing structure of a webbing according to claim 16, wherein the opening portion is constituted by a slit provided along longitudinal directions of the first end part of the first webbing and the second end part of the second webbing.

18. The fixing structure of a webbing according to claim 9, further comprising:

a tightening member which tightens the inserted portion and the inserting member in a state where the inserting member is inserted in the inserted portion.

* * * * *